United States Patent
Gupta et al.

(10) Patent No.: US 8,238,450 B2
(45) Date of Patent: Aug. 7, 2012

(54) DYNAMIC TRANSMITTER NOISE LEVEL ADJUSTMENT FOR DIGITAL SUBSCRIBER LINE SYSTEMS

(75) Inventors: Sanjay Gupta, Pleasanton, CA (US); Amir H. Fazlollahi, Santa Clara, CA (US); Guozhu Long, Fremont, CA (US); Ying Li, Shenzhen (CN); Raphael Jean Cendrillon, Hong Kong (CN)

(73) Assignee: Futurewei Technologies Inc., Plano, TX (US)

( * ) Notice: Subject to any disclaimer, the term of this patent is extended or adjusted under 35 U.S.C. 154(b) by 383 days.

(21) Appl. No.: 12/689,875

(22) Filed: Jan. 19, 2010

(65) Prior Publication Data

US 2010/0195745 A1    Aug. 5, 2010

Related U.S. Application Data

(60) Provisional application No. 61/148,855, filed on Jan. 30, 2009.

(51) Int. Cl.
H04B 3/00    (2006.01)

(52) U.S. Cl. ........ 375/257; 375/219; 375/220; 375/221; 375/222; 375/225; 375/227; 375/258; 375/260; 375/261; 375/295; 375/296; 375/298; 375/316; 370/206; 370/207; 370/208; 370/210; 370/272; 370/273; 370/276; 370/297; 370/343; 370/480; 455/39; 455/67.13; 455/69; 455/73; 455/91; 455/114.3; 455/115.1; 455/115.3; 455/226.3; 379/22.02; 379/22.08; 379/24; 379/26.01; 379/27.03; 379/93.01; 725/111

(58) Field of Classification Search .......... 375/219, 375/220, 221, 222, 225, 227, 257, 258, 260, 375/261, 295, 296, 298, 316; 370/206, 207, 370/208, 210, 272, 273, 343, 480, 276, 297; 455/39, 67.13, 69, 73, 91, 114.3, 115.1, 115.3, 455/226.3; 379/22.02, 22.08, 24, 26.01, 379/27.01, 27.03, 93.01; 725/111
See application file for complete search history.

(56) References Cited

U.S. PATENT DOCUMENTS 7,991,072 B2 *   8/2011   Van Bruyssel ............... 375/296
(Continued)

FOREIGN PATENT DOCUMENTS

CN    1239625 A    12/1999
(Continued)

OTHER PUBLICATIONS

"Series G: Transmission Systems and Media, Digital Systems and Networks—Digital Sections and Digital Line System—Access Networks—Asymmetric Digital Subscriber Line (ADSL) Transceivers 2", ITU-T Recommendation G.992.3, (Jan. 2005).

(Continued)

Primary Examiner — Leon Flores
(74) Attorney, Agent, or Firm — Conley Rose, P.C.; Grant Rodolph; Clint Wilkins (57) ABSTRACT

An apparatus comprising an artificial noise (AN) controller coupled to a digital subscriber line (DSL) transmitter and configured to adjust an AN level for a signal transmitted by the DSL transmitter, wherein the AN level is adjusted based on an actual signal to noise ratio (SNR) of the signal from the receiver to achieve a desired SNR for the signal. Also disclosed is a method comprising maintaining a data rate in a line at about a desired level by adjusting an AN level in a transmitted signal based on a SNR of a received signal.

13 Claims, 7 Drawing Sheets

U.S. PATENT DOCUMENTS

| | | | |
|---|---|---|---|
| 2003/0123560 A1* | 7/2003 | Jacobsen et al. | 375/260 |
| 2003/0174765 A1* | 9/2003 | Van Den Brink et al. | 375/224 |
| 2004/0032902 A1* | 2/2004 | Koifman et al. | 375/222 |
| 2006/0062287 A1 | 3/2006 | Van Bruyssel | |
| 2007/0195871 A1 | 8/2007 | Gulati et al. | |
| 2008/0031313 A1* | 2/2008 | Oksman | 375/222 |

FOREIGN PATENT DOCUMENTS

| | | |
|---|---|---|
| CN | 1753442 A | 3/2006 |
| EP | 1641173 A1 | 3/2006 |
| WO | 9916240 A1 | 4/1999 |

OTHER PUBLICATIONS

"Series G: Transmission Systems and Media, Digital Systems and Networks—Digital Sections and Digital Line System—Access Networks—Asymmetric Digital Subscriber Line (ADSL) Transceivers—Extended Bandwidth ADSL2 (ADSL2plus)", ITU-T Recommendation G.992.5, (Jan. 2009).

Foreign Communication From a Related Counterpart Application—International Search Report, PCT/CN2010/070452, Mar. 31, 2010, 3 pages.

* cited by examiner

DYNAMIC TRANSMITTER NOISE LEVEL ADJUSTMENT FOR DIGITAL SUBSCRIBER LINE SYSTEMS

CROSS-REFERENCE TO RELATED APPLICATIONS

The present application claims priority to U.S. Provisional Patent Application No. 61/148,855 filed Jan. 30, 2009 by Sanjay Gupta, et al. and entitled, "Dynamic Transmitter Noise Level Adjustment for DSL Systems," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide relatively large bandwidth for digital communications over existing subscriber lines. When transmitting data over the subscriber lines, crosstalk interference can occur between the transmitted signals over adjacent twisted-pair phone lines, for example in a same or nearby bundle of lines. Noise and crosstalk in the lines can limit the performance of DSL systems. The noise and crosstalk can be highly non-stationary and vary dramatically, which causes instability in the DSL systems. During active line communications, also referred to as showtime, bit swapping (BS) and/or seamless rate adaption (SRA) may be used to stabilize the system by adjusting bit-loading in a dynamic manner. However, in the case of rapidly changing noise conditions in the lines, BS and SRA may not be fast enough to adapt to the changing line conditions. Therefore, it may be necessary to re-initialize the lines in such conditions, e.g. by deactivating and reactivating the lines, which causes undesirable interruptions in services.

One method to ensure line stability and reduce line re-initialization is to reserve extra noise margin during line initialization and showtime. However, this method can substantially reduce the achievable data rates in the lines. Another method is to use virtual noise (VN), a technique that limits the maximum bit-loading allowed on each tone in the line, e.g. based on the International Telecommunication Union (ITU) Telecommunication Standardization Sector (ITU-T) G.992.3 and G.992.5 standards, which are incorporated herein by reference. The VN method is used to improve DSL stability by ensuring operation of a line at a bit-loading level that can be sustained when worse noise conditions are encountered. As such, different VN levels can be determined for different frequency ranges, e.g. where higher VN levels are applied for frequencies with higher noise. The VN method may allow higher data rates than the extra noise margin method since the VN method can be applied selectively to different bins or tones. However, the VN method requires a communication channel between a central office (CO) transmitter and a customer premise equipments (CPE) receiver, which should be configured to support the VN function. In some legacy systems, the VN method may not be used since the CPEs do not support the VN function.

SUMMARY

In one embodiment, the disclosure includes an apparatus comprising an artificial noise (AN) controller coupled to a DSL transmitter and configured to adjust an AN level for a signal transmitted by the DSL transmitter, wherein the AN level is adjusted based on an actual signal to noise ratio (SNR) of the signal from the receiver to achieve a desired SNR for the signal.

In another embodiment, the disclosure includes an apparatus comprising at least one processor configured to implement a method comprising detecting a SNR for each of a plurality of tones in a received signal, calculating a SNR ratio due to actual noise for each of the tones based on the SNR for each of the tones in the received signal and a SNR for each of the tones before transmission, calculating an AN value for each of the tones based on the SNR due to actual noise for each of the tones and a desired SNR for each of the tones, and adding the AN value for each of the tones in a transmitted signal.

In yet another embodiment, the disclosure includes a method comprising maintaining a data rate in a line at about a desired level by adjusting an AN level in a transmitted signal based on a SNR of a received signal.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One method to ensure line stability in DSL systems is to use AN, which may comprise transmitting a downstream signal that has a reduced SNR from a CO to a CPE, e.g. at a frequency band. The SNR may be reduced at initialization time by transmitting a determined level of noise in the signal at the frequency band. Consequently, when the CPE receives the downstream signal, the CPE may transmit an upstream signal to the CO that has a reduced quantity of bits at the frequency band to protect the signal against the transmitted level of noise. The AN method may provide similar protection and allow similar data rates as the VN method. Additionally, the AN method may be used in legacy systems and may not require supporting a new function in the CPEs.

In some instances, the AN method may not be compatible with the BS and SRA for line stabilization. Since the SNR is reduced at initialization time but not at showtime, the CPE may detect relatively lower noise levels and higher SNR margin at the frequency band at showtime. Detecting the lower noise level at showtime may typically trigger BS or SRA to improve line stabilization, e.g. by adjusting or increasing bit-loading at the frequency band. Using BS and/or SRA (BS/SRA) may cancel the protection provided by the AN, e.g. cancel the added SNR margin in the frequency band. Therefore, BS/SRA may be disabled when the AN method is enabled. Alternatively, if the SNR is reduced at initialization time and at showtime, the combination of the AN level and actual noise level in the line may increase the received noise by about three decibels (dB), e.g. when the actual noise in the line is comparable to the AN level. Such increase in noise level may cause substantial reduction in achievable data rate in the line.

Disclosed herein is a system and method for ensuring line stability in a DSL system using an AN method, which may be compatible with BS/SRA. The AN method may be used with BS/SRA to improve line stability in the DSL system. The AN method may comprise adjusting the SNR in a downstream signal from the CO to the CPE during showtime, e.g. in a dynamic manner. The SNR may be adjusted based on a detected total received noise at the CPE, which may comprise the AN and actual noise in the line. The SNR may be adjusted to maintain the total received noise at the CPE at about a desired level, which may not be too low to affect line stability and trigger BS/SRA. Additionally, the total received noise may not be too high to substantially reduce the achievable data rate in the line. As such, an acceptable balance may be maintained between line stability and achievable data rate.

Figure 1:
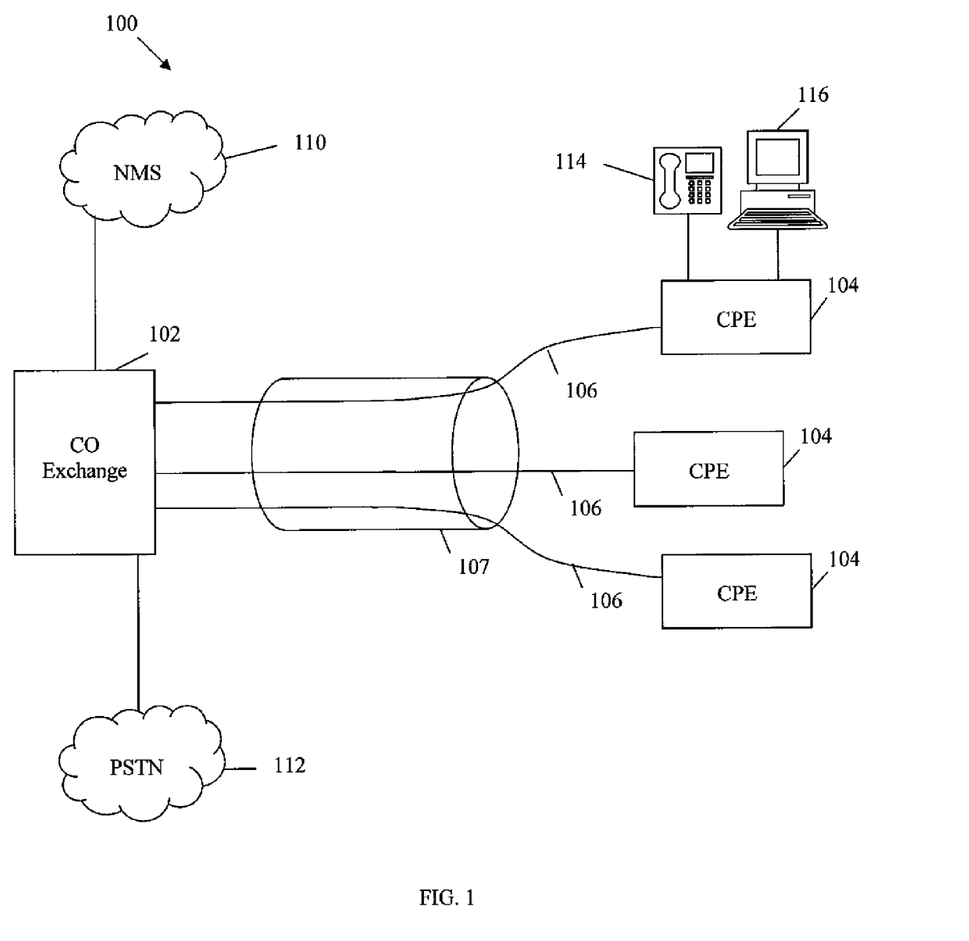
FIG. 1 is a schematic diagram of an embodiment of a DSL system.

FIG. 1 illustrates one embodiment of a DSL system 100. The DSL system 100 may be a very high bit rate DSL (VDSL) or VDSL2 system, an asymmetric DSL (ADSL) or ADSL2 system, or any other DSL system. The DSL system 100 may comprise a CO Exchange 102 and a plurality of customer premise equipments (CPEs) 104, which may be coupled to the CO Exchange 102 via a plurality of subscriber lines 106. At least some of the subscriber lines 106 may be bundled in a binder 107. Additionally, the DSL system 100 may optionally comprise a network management system (NMS) 110 and a public switched telephone network (PSTN) 112, both of which may be coupled to the CO Exchange 102. In other embodiments, the DSL system 100 may be modified to include splitters, filters, management entities, and various other hardware, software, and functionality.

The NMS 110 may be a network management infrastructure that processes data exchanged with the CO Exchange 102 and may be coupled to one or more broadband networks, such as the Internet. The PSTN 112 may be a network that generates, processes, and receives voice or other voice-band signals. In an embodiment, the CO Exchange 102 may be a server located at a central office and may comprise switches and/or splitters, which may couple the NMS 110, the PSTN 112, and the subscriber lines 106. For instance, the splitter may be a 2:1 coupler that forwards data signals received from the subscriber lines 106 to the NMS 110 and the PSTN 112, and forwards data signals received from the NMS 110 and the PSTN 112 to the subscriber lines 106. Further, the splitter may optionally comprise one or more filters to help direct data signals between the NMS 110, the PSTN 112, and the subscriber lines 106. Additionally, the CO Exchange 102 may comprise at least one DSL transmitter/receiver (transceiver), e.g. a VDSL Transceiver Unit at CO (VTU-O), which may exchange signals between the NMS 110, the PSTN 112, and the subscriber lines 106. The signals may be received and transmitted using the DSL transceiver, such as a modem.

In an embodiment, the DSL transceiver may comprise a forward error correction (FEC) codeword generator that generates FEC data. The DSL transceiver may also comprise an interleaver that interleaves the transmitted data across a plurality of tones in many data symbols (excluding sync symbols). For instance, the DSL transceiver may use a discrete multi-tone (DMT) line code that allocates a plurality of bits for each sub-carrier or tone in each symbol. The DMT transceiver may be adjusted to various channel conditions that may occur at each end of a subscriber line. In an embodiment, the DSL transceiver of the CO Exchange 102 may be configured to transmit data at similar or different rates for each subscriber line 106.

In an embodiment, the CPEs 104 may be located at the customer premises, where at least some of the CPEs 104 may be coupled to a telephone 114 and/or a computer 116. The telephone 114 may be hardware, software, firmware, or combinations thereof that generates, processes, and receives voice or other voice-band signals. The CPE 104 may comprise a switch and/or a splitter, which may couple the subscriber lines 106 and the telephone 114 and the computer 116. The CPE 104 may also comprise a DSL transceiver, e.g. a VDSL Transceiver Unit at Remote Terminal (VTU-R), to exchange data between the CPE 104 and the CO Exchange 102 via the subscriber lines 106. For instance, the splitter may be a 2:1 coupler that forwards data signals received from the subscriber lines 106 to the telephone 114 and the DSL transceiver, and forwards data signals received from the telephone 114 and the DSL transceiver to the subscriber lines 106. The splitter may optionally comprise one or more filters to help direct data signals to and from the telephone 114 and the DSL transceiver.

The DSL transceiver, e.g. a modem, in the CPE 104 may transmit and receive signals through the subscriber lines 106. For instance, the DSL transceiver may process the received signals to obtain the transmitted data from the CO Exchange 102, and pass the received data to the telephone 114, the computer 116, or both. The CPEs 104 may be coupled to the CO Exchange 102 directly via the subscriber lines 106 and/or via the subscriber lines 106. For example any of the CPEs 104 may be coupled to a subscriber line 106 from the CO Exchange 102. The CPEs 104 may access the NMS 110, the PSTN 112, and/or other coupled networks via the subscriber lines 106 deployed by the CO Exchange 102.

In an embodiment, the subscriber lines 106 may be telecommunications paths between the CO Exchange 102 and the CPE 106, and may comprise one or more twisted-pairs of copper cable. Typically, random noise may be added to the signals in the subscriber lines, such as due to splices in the lines. Additionally, crosstalk interference may occur between the tones or signals transported through the subscriber lines 106. The crosstalk interference may be related to the power, frequency, and travel distance of the transmitted signals and may limit the communications performance in the network. For instance, when the transmitted signals have higher power spectral densities (PSDs), e.g. over a range of frequencies, the crosstalk between the adjacent subscriber lines 106 (e.g. in a binder) may increase and hence the signal data-rates may decrease. The noise and crosstalk may be highly non-stationary, e.g. vary rapidly, and cause reduced line stability.

Typically, BS/SRA may be used to improve line stability in the subscriber lines 106. The BS and SRA methods may adjust bit-loading, e.g. the quantity of transmitted bits, based on the changes in the noise level (or SNR level) in the line. As such, BS/SRA may be used to maintain substantially stable data rates in the line, and hence prevent or reduce line re-initialization and service interruptions. For instance, when a reduced noise level is detected, BS/SRA may be triggered to increase bit-loading and maintain line stability. Sometimes, when an increased noise level is detected, BS/SRA may also be triggered to decrease bit-loading and maintain line stability.

In an embodiment that further improves line stability, an AN method may be used to adjust the SNR and hence the noise level in a downstream signal from the CO Exchange 102 to any of the CPEs 104 during showtime. The SNR may also be reduced in a downstream signal using initialization time. To adjust the SNR in the downstream signal, the DSL transceiver (or VTU-O) at the CO Exchange 102 may be configured to add AN to the downstream signal. The AN level may be determined based on a total noise level received at the CPE 104. The total noise may be received by the DSL transceiver (or VTU-R) at the CPE 104 and may comprise the noise and/or crosstalk, which may be introduced in the downstream signal at a subscriber line 106. The total noise received at the CPE 104 may also comprise AN, which may be added before transmitting the downstream signal from the CO Exchange 102. Specifically, the AN level may be determined and added to the downstream signal to achieve a balance or a compromise between line stability and achievable data rate in the subscriber lines 106, as described in detail below.

Figure 2:
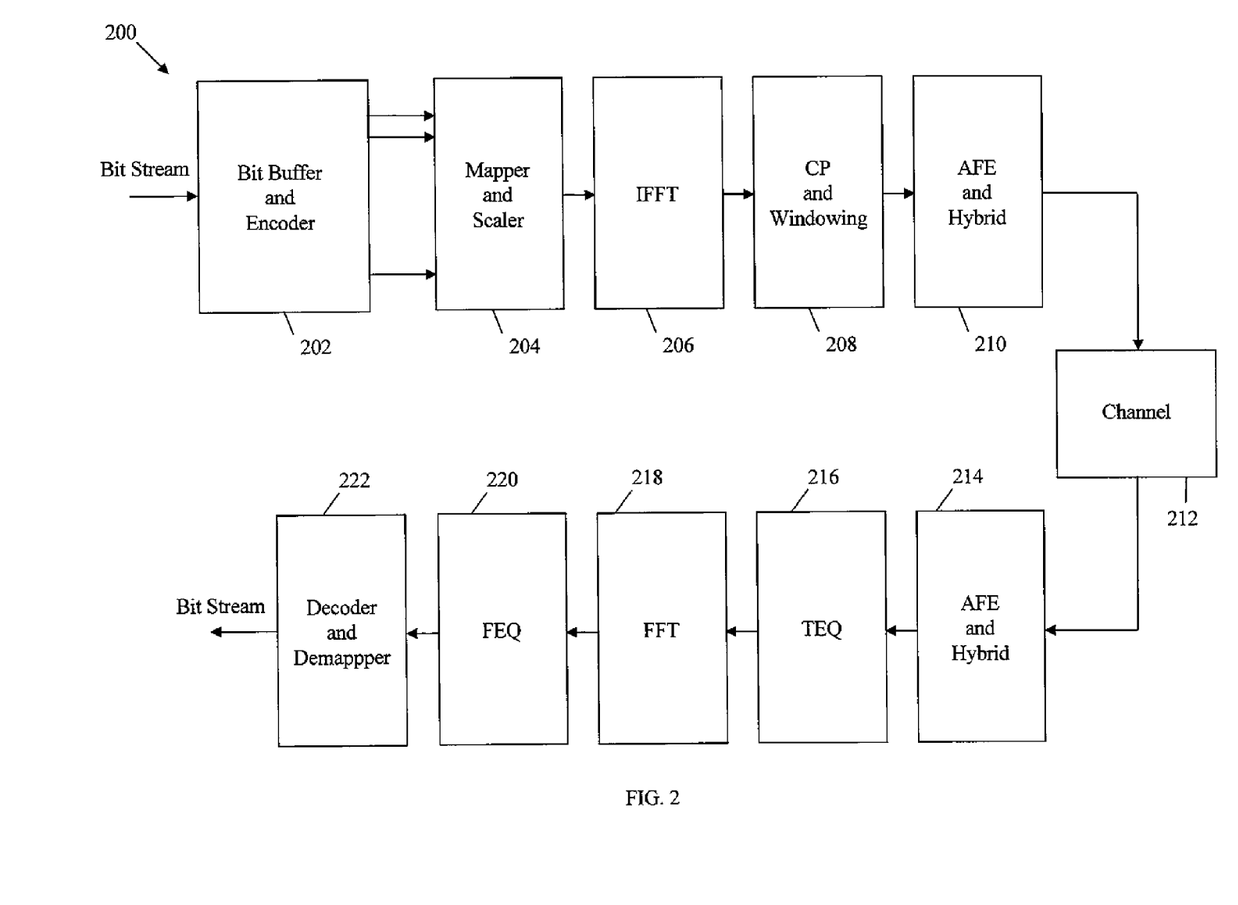
FIG. 2 is a schematic diagram of an embodiment of a DSL transceiver.

FIG. 2 illustrates one embodiment of a DSL transceiver 200, which may be used in the DSL system 100 to maintain a desired balance between line stability and achievable data rate in a line. The DSL transceiver 200 may be located at the CO Exchange 102 and may comprise a plurality of modules for processing and incoming bit stream, modifying the bit stream, and transmitting the modified bit stream. For instance, the DSL transceiver 200 may be used for DMT modulation, where a plurality of bits may be allocated for each tone in a DMT symbol that may be transmitted downstream to a CPE. Additionally, the DSL transceiver 200 may be configured to reduce the SNR in a signal before transmitting the DMT symbol or signal. The DSL transceiver 200 may comprise a bit buffer and encoder 202, a mapper and scaler 204, an inverse fast Fourier transform (IFFT) module 206, a cyclic prefix (CP) and windowing module 208, a first analog front-end (AFE) and hybrid 210, and a channel 212. Additionally, the modules may comprise a second AFE and Hybrid 214, a time domain equalizer (TEQ) 216, a fast Fourier transform (FFT) module 218, a frequency domain equalizer (FEQ) 220, and a decoder and demapper 222.

The bit buffer and encoder 202 may be configured to receive a bit stream, which may comprise data before modulation, encode the bit stream, and forward the bit stream to the mapper and scaler 204. The mapper and scaler 204 may appropriately scale the signal represented by the bit stream. The signal may be represented in complex format:

$$S_i = X_i + jY_i \quad (1)$$

where $S_i$ is the scaled signal value for a tone i, $X_i$ is a real component of the signal, and $Y_i$ is an imaginary component of the signal. The scaled signal may then be forwarded to the IFFT module 206, where the signal may be modulated and may be converted from the frequency domain to the time domain. A CP may then be added to the signal using the CP and windowing module 208 to maintain orthogonality of the sub-channels and prevent inter-symbol interference (ISI). The signal may then be converted from binary format to analog format by the AFE and hybrid 210 and forwarded to the channel 212. The channel 212 may be coupled to the line and transmit the signal downstream, e.g. to a CPE.

The channel 212 may also receive an upstream signal from the CPE and forward the signal to the second AFE and hybrid 214, which may convert the received signal from analog format to digital format. The TEQ 216 may then reduce the impulse response length of the signal over the channel, e.g. below the CP. The FFT module 218 may then convert the signal from the time domain to the frequency domain and forward the signal to the FEQ 220. The FEQ 220 may then compensate for overall channel effects, such as from a copper loop (or line) and or digital filters in the channel 212, and forward the signal to the decoder and demapper 222. The decoder and demapper 222 may then rescale the signal appropriately and provide a bit stream that represents the signal.

In an embodiment, the SNR of the scaled signal may be reduced by introducing AN in the scaled signal. The AN level may be determined appropriately to maintain a desired balance between line stability and achievable data rate in the channel 212. The SNR may be reduced by adding a random signal that represents a noise level to the scaled signal. For instance, a random signal or bit stream generator (not shown) may be coupled to the mapper and scaler 204 and/or the IFFT module 206, and may generate an AN signal, which may be added to the scaled signal. After adding AN to the scaled signal, an adjusted scaled signal may be forwarded to the IFFT module 206.

Figure 3:
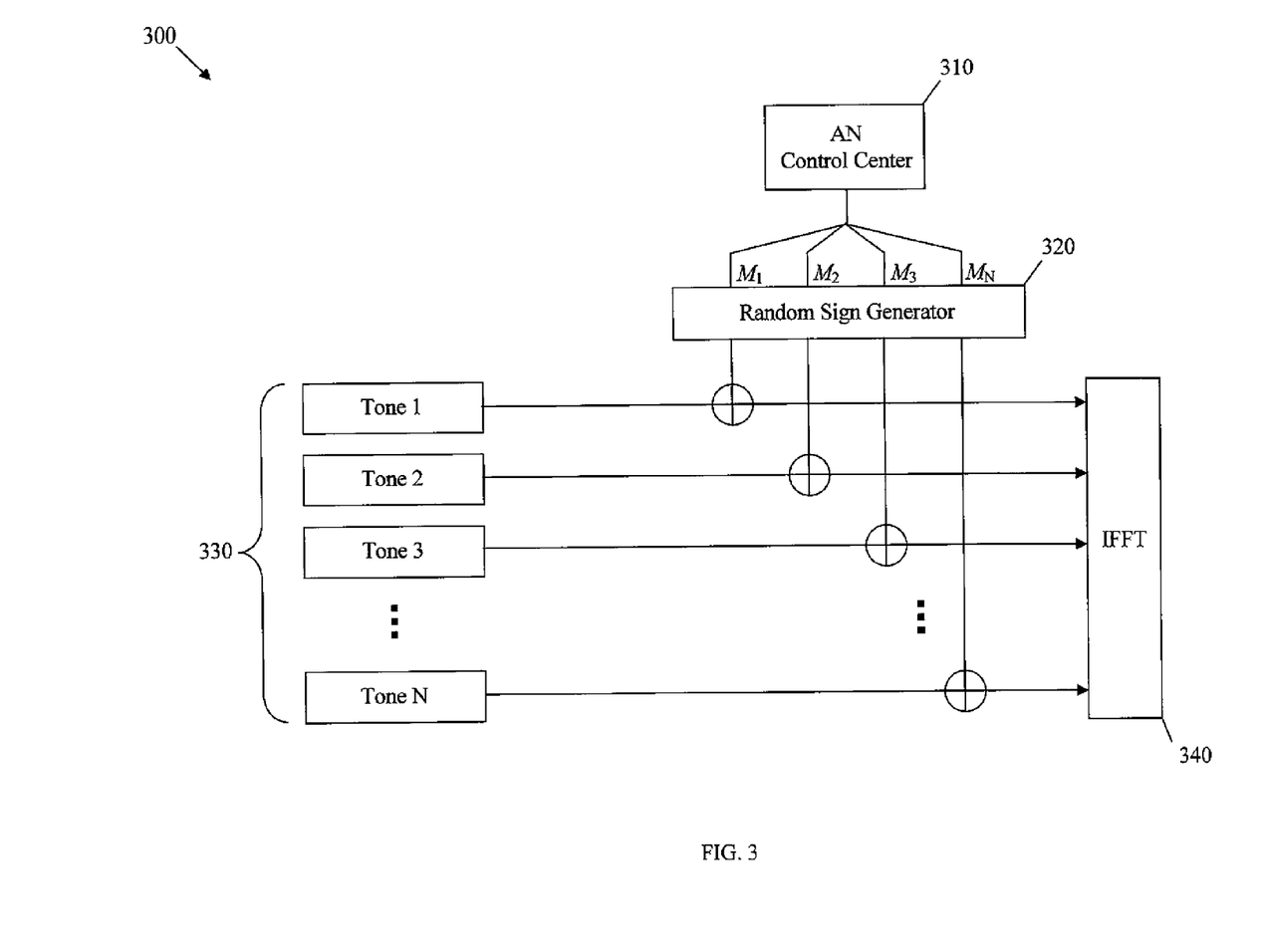
FIG. 3 is a schematic diagram of an embodiment of an AN generator.

FIG. 3 illustrates one embodiment of an AN generator 300, which may be used in a DSL system, such as the DSL system 100. For instance, the AN generator 300 may be coupled to a DSL transceiver, such as DSL transceiver 200, or at least to some of the components of the DSL transceiver. The AN generator 300 may be configured to add AN to the downstream signal, e.g. in the form of an AN signal. The AN generator 300 may be used during MEDELY pseudo-random bit sequence (PRBS) generator, which may be used in an ADSL, ADSL2, or VDSL2 system and/or during showtime. The AN generator 300 may comprise an AN control center 310 and a random sign generator 320. Additionally, the AN generator 300 may be coupled to a plurality of sub-channels (tones) 330 and an IFFT module 340, which may be located in the DSL transceiver. The sub-channels 330 may transport a plurality of tones of a DMT symbol. For example, the DMT symbol may comprise about N tones, tone 1, tone 2, tone 3, ..., and tone N, where N is an integer. The symbol may be a scaled signal, e.g. by a mapper and scaler module of the DSL transceiver.

The AN control center 310 may be configured to generate randomly a plurality of AN values (e.g. $M_1, M_2, M_3, \ldots$, and $M_N$) for the tones in the sub-channels 330, which may be used to obtain a complex AN per tone signal:

$$+/-M_i +/- M_i \quad (2)$$

where the real and imaginary components of the complex AN signal may be each about equal to $M_i$ for the tone i. The real and imaginary components of the AN signal may determine the desired AN level and hence the SNR level in the downstream signal. The AN signal may be added to the scaled signal during MEDLEY and showtime in a frequency domain for each tone.

The AN signal may be added in the tones using a random sign for each tone, e.g. a plus ("+") sign or a minus ("−") sign. The signs may be randomly selected by the random sign generator 320 for each tone in the DMT symbol. The random signs may be selected separately or jointly for the real and imaginary parts of the AN for each tone. After adding the noise signal to the scaled signal, the scaled signal per tone may be represented as:

$$S_i = (X_i + (\pm M_i)) + j(Y_i + (\pm M_i)) \quad (3)$$

Thus, the AN may be a tone-dependent complex additive binary noise that is added in a frequency domain to an encoded complex quadrature amplitude modulation (QAM) signal in each tone, i, with a scaling factor, $M_i$ and a random sign for each of its real and imaginary parts; i.e. $+/-M_i+/-jM_i$, where j is imaginary unity number $\sqrt{-1}$. Hence, when a substantial noise level is added to the scaled signal, the SNR of the adjusted scaled signal per tone may be approximated by:

$$SNR_i = 10 \times \log\left(\frac{X_i^2 + Y_i^2}{2 \times M_i^2}\right), \quad (4)$$

where $SNR_i$ is the SNR for the tone i. The adjusted scaled signal may be forwarded to an IFFT module in the DSL transceiver for signal modulation and further processing.

In an embodiment, a plurality of $M_i$ values for a plurality tones may be generated based on a desired SNR at prior time, e.g. before obtaining the scaled signal. The $M_i$ values may be stored in a local table or memory, e.g. by a management system, and may then be added to the obtained scaled signal. For instance, a set of $M_i$ values that were used to maintain an operation state, e.g. a data rate level and a noise level, may be stored by the management system. Subsequently, if the operation state changes, the stored $M_i$ values may be used to restore the operation state.

Figure 4:
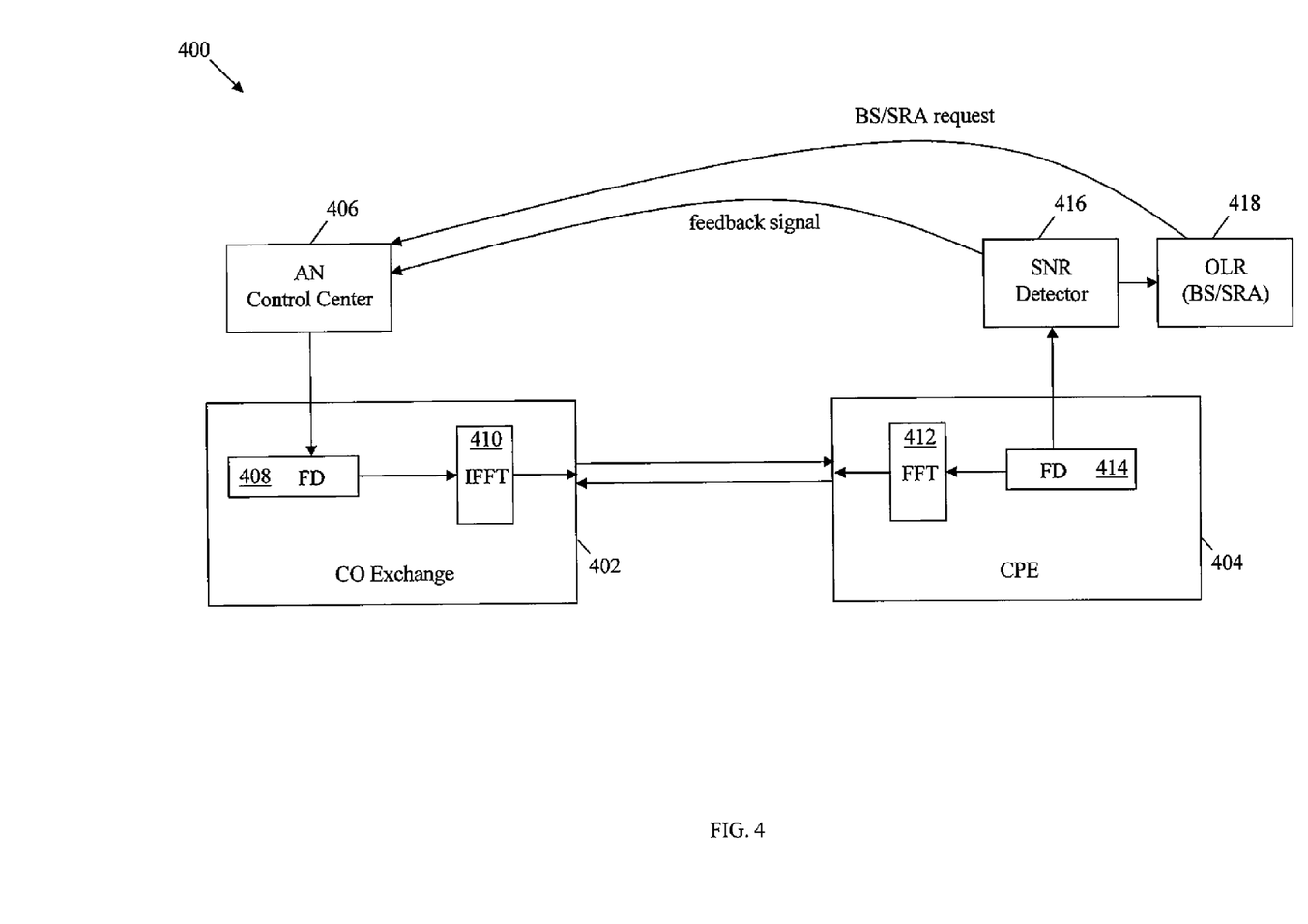
FIG. 4 is a schematic diagram of an embodiment of an AN based DSL system.

FIG. 4 illustrates one embodiment of an AN based DSL system 400, which may use an AN generator, such as the AN generator 400, to improve line stability. The AN based system may comprise a CO Exchange 402 and a CPE 404, which may be substantially similar to the corresponding components of the DSL system 100. The CO Exchange 402 may comprise an AN control center 406, a transmitter frequency domain (FD) channel 408, and an IFFT module 410. The CPE 404 may comprise a FFT module 412, a receiver FD channel 414, a SNR detector 416, and an on-line reconfiguration (OLR) module 418.

The AN control center 406 may determine the AN values for each tone in a symbol, as described above. The AN control center 406 may send the AN values to the transmitter FD 408, where the AN values may be added to the corresponding signal values for each tone in the symbol. The signal that comprises the symbol may be sent to the IFFT module 410, which may convert the signal from the frequency domain to the time domain. The frequency domain signal may then be transmitted downstream to the CPE 404. As such, each tone in the transmitted signal may have a SNR value $SNR_i$, which may reflect the AN for each tone.

The CPE 404 may receive the signal from the CO Exchange 402. The received signal may be converted from the frequency domain to the time domain by the FFT module 412, which may then forward the signal to the receiver FD channel 414. The receiver FD channel 414 may forward a copy of the signal to the SNR detector 416, which may measure the SNR values, $SNR_i'$, of the received signal for each tone. The SNR values of the tones of the received signal at the CPE 404 may not be equal to SNR values of the tones the transmitted signal from the CO Exchange 402, since additional noise may be introduced to the signal in the line. The received signal may have a modified SNR that reflects the total noise in the signal, e.g. AN from the CO Exchange 402 and actual noise from the line. Accordingly, the SNR value $SNR_i'$ of each received tone may be smaller than the SNR value $SNR_i$ of each transmitted tone.

For instance, the power of the received signal, $S_r$, may be equal to the sum of the power of the transmitted signal, $S_t$, the power of transmitter added AN, $N_{r0}$, and the power of the actual noise in the line, $N_{r1}$. As such, the value of $SNR_i'$ for each received tone may be calculated by:

$$SNR_i' = Sr/(N_{r0} + N_{r1}) \quad (5)$$

The SNR value of each received tone and the SNR value of each corresponding transmitted tone may be used to calculate the SNR value of the received signal due to actual noise and without considering AN, $SNR_i''$. The relationship between the SNR values of the received tone, transmitted tone, and received tone due to actual noise only may be calculated by:

$$SNR_i'' = 1/(1/SNR_i' - 1/SNR_i) \quad (6)$$

The SNR detector 416 may signal the OLR module 418 if the detected SNR of the received signal, (e.g. for all the received tones) exceeds a threshold. For instance, if the AN level added by the transmitter is comparable to the actual noise level in the line, the SNR of the received signal may be about 3 dB lower than the SNR of the transmitted signal. As such, the SNR detector 416 may signal the OLR module 418 to trigger BS/SRA to decrease bit-loading and maintain line stability.

When triggered, the OLR module 418 may send a BS/SRA request to the AN control center 406 to increase the AN level in a subsequent transmitted signal to maintain line stability. However, increasing the AN level beyond a limit may reduce the achievable data rate in the line, which may waste system resources. Therefore, the AN control center 406 may properly determine an AN level to adjust the SNR values of subsequent transmitted tones. Specifically, the AN level for the subsequent transmitted tones may be determined based on the SNR values of the received tones in the CPE 404. The AN level for subsequently transmitted tones may adapt to the actual noise level in the line to maintain the SNR values of subsequently received tones at a desired protection level. The AN control center 406 may obtain the SNR values of the received tones in the CPE 404 (e.g. $SNR_i'$) from the SNR detector 416 via a feedback signal and use the values of $SNR_i'$ and the SNR values of the transmitted tones (e.g. $SNR_i$) to calculate the SNR values of the received tones due to actual noise in the line (e.g. $SNR_i''$). Alternatively, the AN control center may obtain the values of $SNR_i''$ from the SNR detector 416 via the feedback signal.

Figure 5:
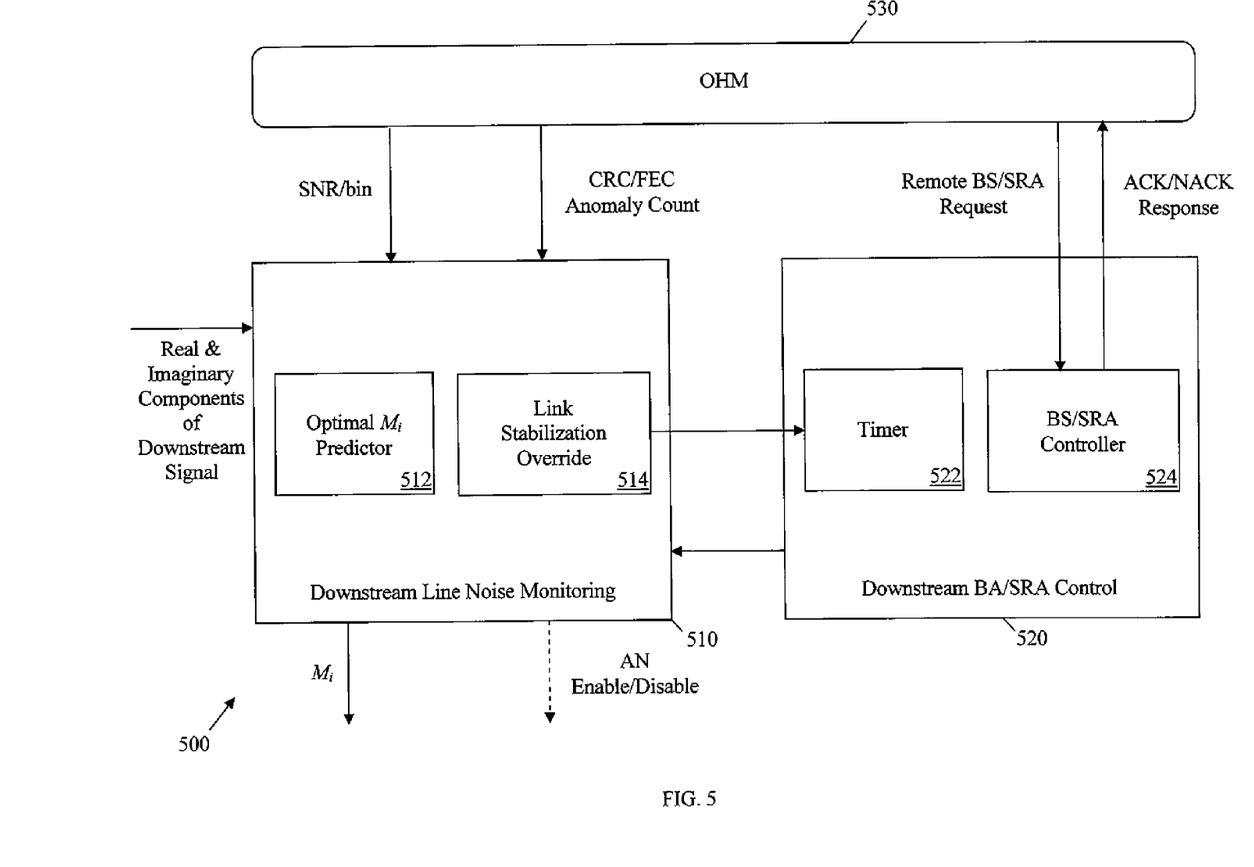
FIG. 5 is a schematic diagram of an embodiment of an AN controller.

FIG. 5 illustrates one embodiment of an AN controller 500, which may be used to adjust the AN level in a signal transmitted from a CO to a CPE. For instance, the AN controller 500 may be located at the AN control center 406 at the CO Exchange 402. The AN level may be adjusted to maintain the SNR of the corresponding signal (received by the CPE) at a protection level below a threshold for triggering BS/SRA. As such, line stability may be maintained. Additionally, the SNR of the received signal may be maintained at a protection level above a low threshold to maintain line data rate. The AN controller 500 may comprise a downstream line noise monitoring module 510, a downstream BS/SRA control module 520, and an overhead messaging (OHM) module 530. The downstream line noise monitoring module 510 may comprise an optimal noise-per-tone ($M_i$) predictor 512 and a link stabilization override module 514. The downstream BS/SRA control module 520 may comprise a Timer 522 and a BS/SRA controller 524.

The optimal $M_i$ predictor 512 may be configured to collect a plurality of SNR per tone (SNR/bin) values from the CPE via the OHM 530. The received SNR/bin values may comprise the SNR values of the received tones in the CPE (e.g. $SNR_i'$). The optimal $M_i$ predictor 512 may use the values of $SNR_i'$ and the locally obtained values of $SNR_i$ to calculate the SNR values due to external noise in the tones (actual noise in the line) $SNR_i''$, e.g. using equation (6). The values of $SNR_i$ may be calculated by detecting the downstream transmitted signal level and the AN level. The optimal $M_i$ predictor 512 may verify if the values of $SNR_i''$ exceed acceptable SNR values due to actual noise in the tones. The values of $SNR_i''$ may be compared to desired SNR values, $SNR_{id}$, which may correspond to the bit-loading in the transmitted signal. If the values of $SNR_i''$ exceed the values of $SNR_{id}$ in the tones, AN control may be enabled to reduce the SNR of the received signal to an acceptable or desired level that maintains line stability. Accordingly, the optimal $M_i$ predictor 512 may calculate new values for $SNR_i$ based on the values of $SNR_{id}$, such as:

$$SNR_i = 1/(1/SNR_{id}' - 1/SNR_i'') \qquad (7)$$

After obtaining the values of $SNR_i$, the optimal $M_i$ predictor 512 may calculate new values for $M_i$ for the tones to realize the new values of $SNR_i$. The values of $M_i$ may be calculated based on the values of $SNR_i$ and the real and imaginary components of the downstream transmitted signal. The new values for $M_i$ may be sent to the transmitter to be used to reduce and adjust the SNR of the transmitted signal and improve line stability. Alternatively, if the values of $SNR_i''$ do not exceed the values of $SNR_{id}$ in the tones, the optimal $M_i$ predictor 512 may disable AN control by setting the values of $M_i$ to zero. As such, no substantial AN may be added to the transmitted downstream signal to maintain the SNR of the transmitted signal and the data rate in the line.

The link stabilization override module 514 may be configured to monitor Cyclic Redundancy Check (CRC) and/or FEC anomaly counts, remote BS/SRA requests via the OHM 530, or both. The CRC and/or FEC (CRC/FEC) anomaly count and the remote BS/SRA request may be sent by the CPE and received by the CO via the OHM 530. Link stabilization override module 514 may receive a substantially high CRC/FEC anomaly count if errors exist in the received signal at the CPE, due to relatively high noise levels. As such, the values of $SNR_i'$ may be lower than the values of $SNR_{id}$ in the tones.

If the link stabilization override module 514 detects a substantially high CRC/FEC anomaly count, the link stabilization override module 514 may also verify if any SNR/bin values are received via the OHM 530, e.g. at about the same time of receiving the CRC/FEC anomaly count. If the SNR/bin values are not received, for instance due to unavailable measurements or slow update rate of the CPE, the downstream line noise monitoring module 510 initiate a transient response. Accordingly, the optimal $M_i$ predictor 512 may set the values of $M_i$ to about zero to disable AN control to improve the SNR in the transmitted signal. Additionally, SRA up-shift (or data rate increase) requests from the CPE may be blocked e.g. for a predetermined time period. However, the CO may still be able to receive BS request and or SRA down-shift (or data rate decrease) requests. Sometime after receiving the CRC/FEC count, the downstream line noise monitoring module 510 may detect the SNR/bin values. For instance, the link stabilization override module 514 may set the Timer 522 to start a first waiting time $T_1$. The Timer 522 may be triggered whenever the values for $M_i$ are to be changed. After the first waiting time $T_1$ expires, the SNR/bin values may be detected. The optimal $M_i$ predictor 512 may use the SNR/bin values to calculate new values for $M_i$ for the tones and enable AN control again. Sometime after blocking the SRA up-shift requests, the requests may be allowed again. For instance, the link stabilization override module 514 may set the Timer 522 to start a second waiting time $T_2$. After the second waiting time $T_2$ expires, the SRA up-shift requests may be received.

Alternatively, if the SNR/bin values are received at about the same time as the CRC/FEC anomaly count, the downstream line noise monitoring module 510 may obtain the values of $SNR_i'$ in the SNR/bin values or from a BS/SRA request. The values of $SNR_i'$ may be used to calculate the SNR values due to actual noise in the tones (e.g. $SNR_i''$). The values of $SNR_i''$ may then be compared to the desired SNR values, $SNR_{id}$. If the values of $SNR_{id}$ exceed the values of $SNR_i''$ by a substantially small amount, there may be no significant change in line data rate and hence line stability. For example, the values of $SNR_i''$ may be smaller than $SNR_{id}$ but greater than about $SNR_{id} - \Delta 1$, where $\Delta 1$ may be a small threshold value. In this case, removing AN from the transmitted signal may be sufficient to maintain line stability. Accordingly, the values of $M_i$ may be set to zero and AN control may be disabled. If a BS/SRA request is received at about the same time as the CRC/FEC anomaly count and the SNR/bin values, the BS/SRA request may be rejected by the BS/SRA controller 524. The BS/SRA controller 524 may be configured to detect any BS/SRA requests and in return send an acknowledgement (ACK)/negative acknowledgement (NACK) message response via the OHM 530. The BS/SRA controller 524 may receive a BS/SRA request if the noise level in the received signal at the CPE is relatively low. Thus, a BS/SRA request may be sent to request an increase in line data rate. Since line stability may be maintained by removing AN from the transmitted signal, no subsequent BS/SRA requests may be expected from the CPE.

If the values of $SNR_{id}$ further exceed the values of $SNR_i''$ by a predetermined limit, there may be some change in line data rate, which may be accounted for by removing AN from the transmitted signal. For example, the values of $SNR_i''$ may be smaller than $SNR_{id} - \Delta 1$ but greater than about $SNR_{id} - \Delta 2$, where $\Delta 2$ may be a second threshold that may be greater than $\Delta 1$. In this case, removing AN from the transmitted signal may improve line stability. Accordingly, the values of $M_i$ may be set to zero and AN control may be disabled. If a BS/SRA request is received at about the same time as the CRC/FEC anomaly count and the SNR/bin values, the BS/SRA request may be rejected. However, a subsequent BS/SRA request may be further expected from the CPE if the noise conditions are not improved or worsened.

If the values of $SNR_{id}$ exceed the values of $SNR_i''$ by a substantial amount, line stability may be affected. For example, the values of $SNR_i''$ may be smaller than $SNR_{id} - \Delta 2$. In this case, removing AN from the transmitted signal may not be sufficient. As such, the values of $M_i$ may be set to about zero to disable AN control. Additionally, if a BS/SRA request is received, the transmitter may reduce the bit-loading and hence line data rate. The data rate may be subsequently increased when a subsequent BS/SRA request is sent to increase the data rate.

Figure 6:
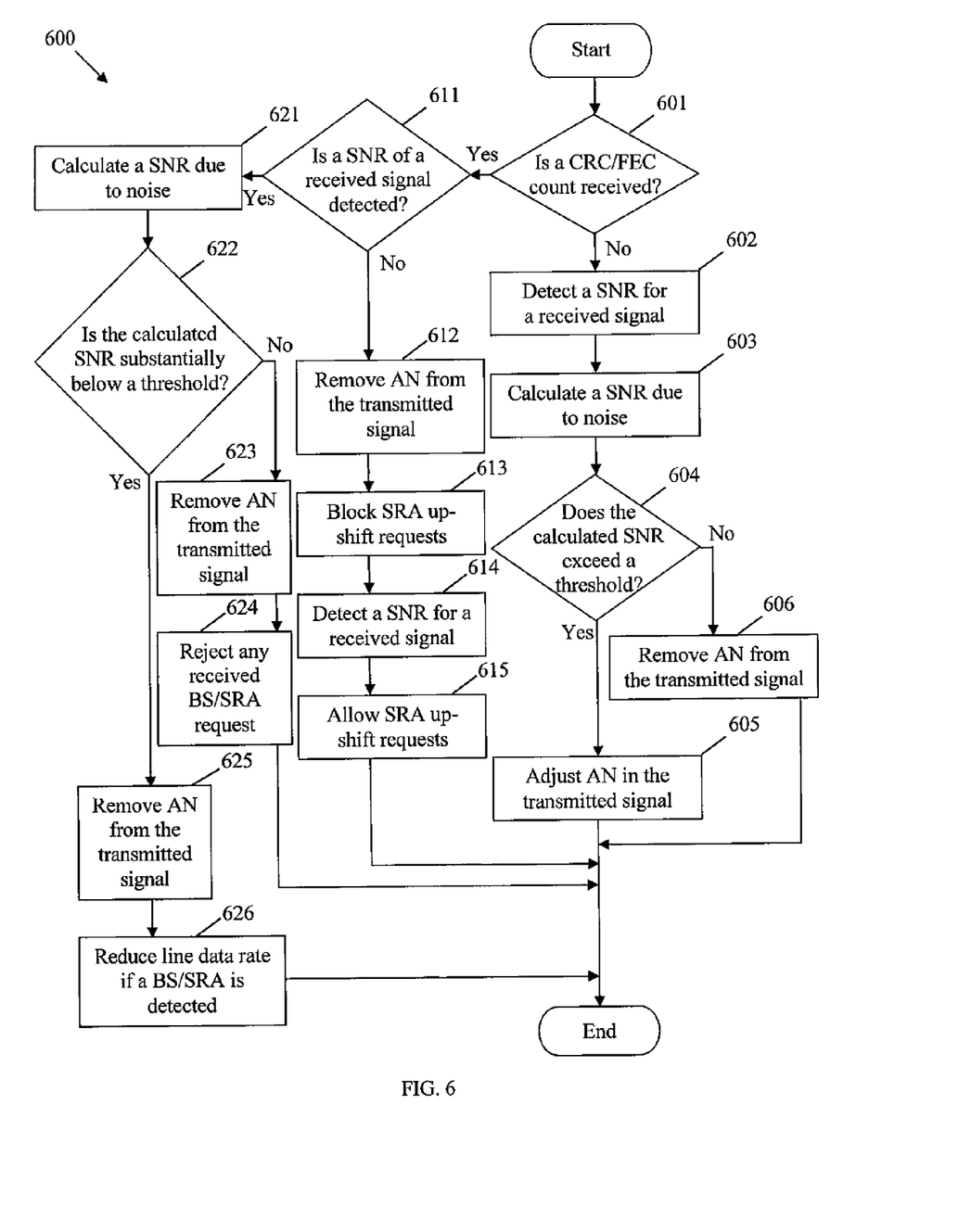
FIG. 6 is a flowchart of an embodiment of an AN method.

FIG. 6 illustrates an embodiment of an AN control method 600, which may be implemented by an AN controller at a CO to improve line stability and maintain line data rate. The AN control method 600 may begin at block 601, where the method 600 may verify whether a CRC/FEC count is received, e.g. from a CPE. If a CRC/FEC count is not detected, then the method 600 may proceed to block 602. Otherwise, upon receiving a CRC/CPE count, the method may proceed to block 611. In an embodiment, the method 600 may verify whether a substantially high CRC/FEC count is received, e.g. that exceeds a predetermined limit. Thus, the method may proceed to block 602 if the CRC/FEC count is less than about the predetermined limit or may proceed to block 611 if the CRC/FEC count is greater than about the predetermined limit.

At block 602, a SNR for a received signal may be detected. For instance, the AN controller at the CO may detect the SNR values of the received signal tones (e.g. $SNR_i'$) at the CPE. At block 603, a SNR due to noise may be calculated for the received signal. For instance, the AN controller may calculate the SNR values of the receive signal tones due to actual noise in the line (e.g. $SNR_i''$) based on the values of $SNR_i'$, as described above. At block 604, the method 600 may verify whether the calculated SNR values exceed a threshold, which may represent a desired SNR corresponding to a bit-loading in the line. For instance, the AN controller may determine if the values of $SNR_i''$ exceed the values of $SNR_{i,d}$. If the calculated SNR values exceed the threshold, the method may proceed to block 605, where the AN in the transmitted signal may be adjusted, e.g. based on the values of $SNR_{i,d}$ using equation (7). The method 600 may then end. Alternatively, if the calculated SNR values do not exceed the threshold at block 604, then the method 600 may proceed to block 606, where the AN may be removed from the transmitted signal. The method 600 may then end.

At block 611, the method 600 may verify whether a SNR for a received signal is detected, e.g. that corresponds to the CRC/FEC count. If no such SNR signal is detected, then the method may proceed to block 612. Otherwise, if the condition in block 611 is satisfied, then the method may proceed to block 621. At block 612, the AN may be removed from the transmitted signal. At block 613, SRA up-shift requests may be blocked, e.g. for a predetermined period of time. At block 614, a SNR for a received signal may be detected. For example, the AN controller may detect the values of $SNR_i'$ from the CPE after a period equal to about $T_1$ from receiving the CRC/FEC count. Next, at block 615, SRA up-shift requests may be allowed again. For example, the AN controller may resume receiving any BS/SRA requests after a period equal to about $T_2$ from receiving the CRC/FEC count. The method 600 may then end.

At block 621, a SNR due to noise may be calculated for the received signal. For instance, the AN controller may calculate the values of $SNR_i''$ based on the values of $SNR_i'$. At block 622, the method 600 may verify whether the calculated SNR is substantially below a threshold. For example, the AN controller may determine if the values of $SNR_i''$ is substantially below the values of $SNR_{i,d}$, less than about $SNR_{i,d}-\Delta 1$ or about $SNR_{i,d}-\Delta 2$. In an embodiment, the threshold may be equal to about 90 percent, about 80 percent, about 70 percent, about 60 percent, or about 50 percent of the desired SNR per tone. If the values of $SNR_i''$ are greater than, about equal to, or slightly smaller than the values of $SNR_{i,d}$, then the method 600 may proceed to block 623. Alternatively, if the condition in block 622 is satisfied, then the method 600 may proceed to block 625. At block 623, the AN may be removed from the transmitted signal and then, at block 624, any received BS/SRA request may be rejected. The BS/SRA request may be rejected if received at about the same time of removing the AN from the transmitted signal. Alternatively, at block 625, the AN may be removed from the transmitted signal and then, at block 626, the line data rate may be reduced if a BS/SRA request is detected. The method 600 may then end.

Figure 7:
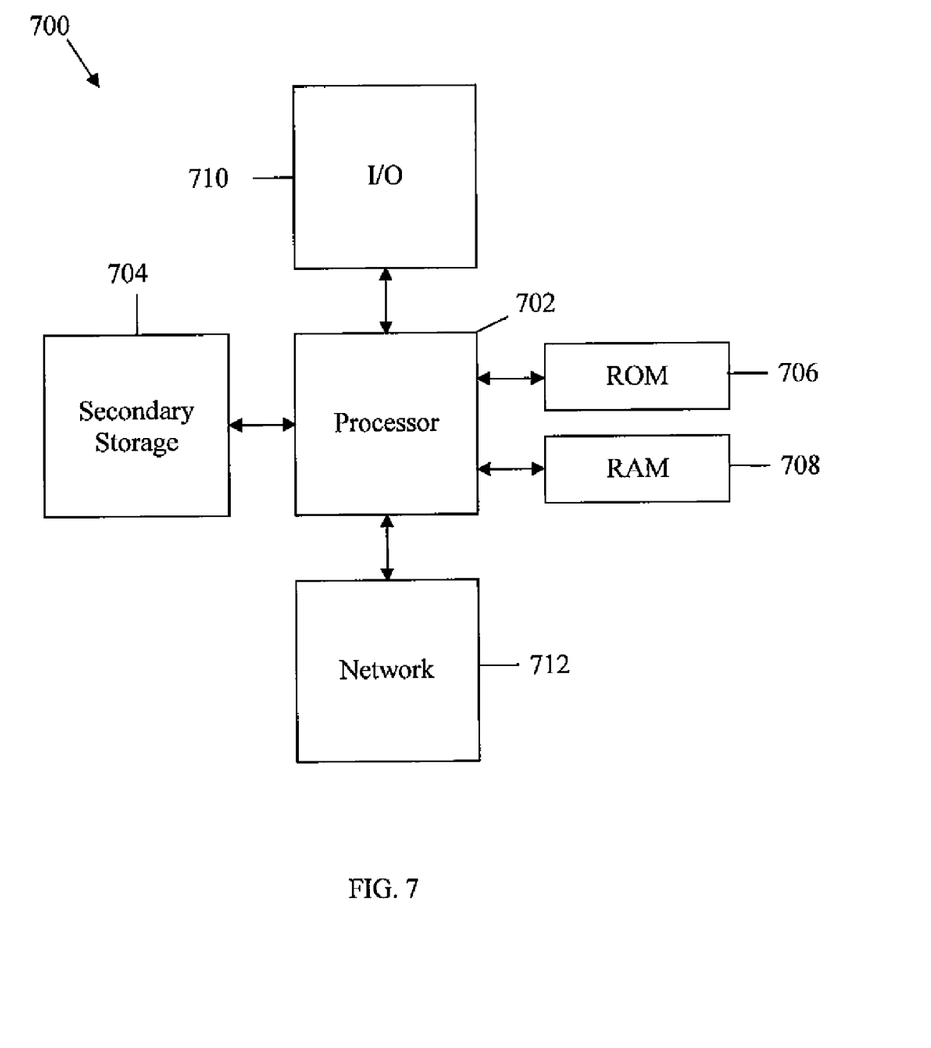
FIG. 7 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 may include a processor 702 (which may be referred to as a central processor unit or CPU) that is in communication with any memory devices including secondary storage 704, read only memory (ROM) 706, random access memory (RAM) 708, input/output (I10) devices 710, and network connectivity devices 712, or combinations thereof. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising: an artificial noise (AN) controller coupled to a digital subscriber line (DSL) transmitter and configured to adjust an AN level for a signal transmitted by the DSL transmitter, wherein the AN level is adjusted based on an actual signal to noise ratio (SNR) of the signal from the receiver to achieve a desired SNR for the signal, wherein the AN controller comprises: a line noise monitor, a bit swapping (BS)/seamless rate adaption (SRA) control module coupled to the line noise monitor, and an overhead messaging (OHM) module coupled to the line noise monitor and the BS/SRA control module.

2. The apparatus of claim 1, wherein the AN is a tone-dependent complex additive binary noise that is added in a frequency domain to an encoded complex quadrature amplitude modulation (QAM) signal in each tone and has a scaling factor and random sign for each of its real and imaginary parts.

3. The apparatus of claim 2, wherein the AN generator is coupled to an inverse fast Fourier transform (IFFT) module in the transmitter, and wherein the tones are forwarded to the IFFT module after adding or subtracting the AN values to the tones according to the random signs generated by a random sign generator.

4. The apparatus of claim 1, wherein the line noise monitor comprises:
an AN value predictor configured to calculate a SNR of the signal due to actual noise based on the SNR of the signal from the receiver and adjust the AN level based on the calculated SNR of the signal due to actual noise and the desired SNR for the signal; and
a link stabilization override module configured to monitor via the OHM module a Cyclic Redundancy Check (CRC) and/or Forward Error Correction (FEC) anomaly count, a remote BS/SRA request, or both.

5. The apparatus of claim 4, wherein the BS/SRA control module comprises:
a timer configured to start and then stop when adjusting the AN level; and
a BS/SRA controller configured to detect the BS/SRA request and in return send an acknowledgement (ACK)/negative acknowledgement (NACK) response.

6. An apparatus comprising: at least one processor configured to implement a method comprising: detecting a signal to noise ratio (SNR) for each of a plurality of tones in a received signal; calculating a SNR ratio due to actual noise for each of the tones based on the SNR for each of the tones in the received signal and a SNR for each of the tones before transmission; calculating an artificial noise (AN) value for each of the tones based on the SNR due to actual noise for each of the tones and a desired SNR for each of the tones; and adding the AN value for each of the tones in a transmitted signal, wherein the SNR due to actual noise is calculated by:

$$SNR_i''=1/(1/SNR_i'-1/SNR_i),$$

where $SNR_i''$ is the SNR ratio due to actual noise for a tone i, $SNR_i'$ is the SNR for the tone i in the received signal, and $SNR_i$ is the SNR for the tone i before transmission.

7. An apparatus comprising: at least one processor configured to implement a method comprising: detecting a signal to noise ratio (SNR) for each of a plurality of tones in a received signal; calculating a SNR ratio due to actual noise for each of the tones based on the SNR for each of the tones in the received signal and a SNR for each of the tones before transmission; calculating an artificial noise (AN) value for each of the tones based on the SNR due to actual noise for each of the tones and a desired SNR for each of the tones; and adding the AN value for each of the tones in a transmitted signal, wherein the AN value is calculated to obtain an adjusted SNR for each of the tones in the transmitted signal according to:

$$SNR_i=1/(1/SNR_{id}'-1/SNR_i''),$$

where $SNR_i$ is the adjusted SNR for the tone i in the transmitted signal, $SNR_{id}'$ is the desired SNR for the tone i, and $SNR_i''$ is the SNR ratio due to actual noise for the tone i.

8. An apparatus comprising: at least one processor configured to implement a method comprising: detecting a signal to noise ratio (SNR) for each of a plurality of tones in a received signal; calculating a SNR ratio due to actual noise for each of the tones based on the SNR for each of the tones in the received signal and a SNR for each of the tones before transmission; calculating an artificial noise (AN) value for each of the tones based on the SNR due to actual noise for each of the tones and a desired SNR for each of the tones; and adding the AN value for each of the tones in a transmitted signal, wherein the AN value is set to zero if the SNR in the received signal is less than the desired SNR.

9. An apparatus comprising: at least one processor configured to implement a method comprising: detecting a signal to noise ratio (SNR) for each of a plurality of tones in a received signal; calculating a SNR ratio due to actual noise for each of the tones based on the SNR for each of the tones in the received signal and a SNR for each of the tones before transmission; calculating an artificial noise (AN) value for each of the tones based on the SNR due to actual noise for each of the tones and a desired SNR for each of the tones; and adding the AN value for each of the tones in a transmitted signal, wherein the method further comprising: detecting a Cyclic Redundancy Check (CRC) and/or Forward Error Correction (FEC) anomaly count before detecting the SNR for the tones in the received signal.

10. The apparatus of claim 9, wherein the method further comprising:
adjusting the AN value to about zero for each of the tones in the transmitted signal;
blocking any up-shill SRA request;
detecting the SNR for the tones in the received signal after a first time period from detecting the CRC and/or FEC anomaly count; and
accepting the up-shift SRA request again after a second time period from blocking the up-shift SRA request.

11. The apparatus of claim 9, wherein the method further comprising:
- adjusting the AN value to about zero for each of the tones in the transmitted signal after detecting the SNR for the tones in the received signal; and
- rejecting any bit swapping (BS)/seamless rate adaption (SRA) request at about the same time of adjusting the AN value if the calculated SNR ratio due to actual noise is slightly smaller than the desired SNR.

12. The apparatus of claim 11, wherein the BS/SRA request is rejected using an acknowledgement (ACK)/negative acknowledgement (NACK) response.

13. The apparatus of claim 9, wherein the method further comprising:
- adjusting the AN value to about zero for each of the tones in the transmitted signal after detecting the SNR for the tones in the received signal; and
- reducing a data rate in the line upon detecting a bit swapping (BS)/seamless rate adaption (SRA) request at about the same time of adjusting the AN value if the calculated SNR ratio due to actual noise is substantially smaller than the desired SNR.

* * * * *

UNITED STATES PATENT AND TRADEMARK OFFICE
CERTIFICATE OF CORRECTION

PATENT NO.           : 8,238,450 B2                                          Page 1 of 1
APPLICATION NO.      : 12/689875
DATED                : August 7, 2012
INVENTOR(S)          : Sanjay Gupta et al.

It is certified that error appears in the above-identified patent and that said Letters Patent is hereby corrected as shown below:

Column 14, line 62, claim 10 should read:

The apparatus of claim 9, wherein the method further comprising:
    adjusting the AN value to about zero for each of the tones in the transmitted signal;
    blocking any up-shift SRA request;
    detecting the SNR for the tones in the received signal after a first time period from detecting the CRC and/or FEC anomaly count; and
    accepting the up-shift SRA request again after a second time period from blocking the up-shift SRA request.

Signed and Sealed this
Second Day of October, 2012

David J. Kappos
*Director of the United States Patent and Trademark Office*